(12) United States Patent
Senatori

(10) Patent No.: US 9,389,648 B2
(45) Date of Patent: Jul. 12, 2016

(54) CONNECTION SYSTEMS AND METHODS

(75) Inventor: Mark David Senatori, The Woodlands, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 223 days.

(21) Appl. No.: 13/259,925

(22) PCT Filed: Dec. 18, 2009

(86) PCT No.: PCT/US2009/068611
§ 371 (c)(1),
(2), (4) Date: Sep. 23, 2011

(87) PCT Pub. No.: WO2011/075130
PCT Pub. Date: Jun. 23, 2011

(65) Prior Publication Data
US 2012/0014052 A1    Jan. 19, 2012

(51) Int. Cl.
*G06F 1/00* (2006.01)
*G06F 1/16* (2006.01)
*H04M 1/02* (2006.01)

(52) U.S. Cl.
CPC ............ *G06F 1/1683* (2013.01); *G06F 1/1681* (2013.01); *H04M 1/0218* (2013.01); *H04M 1/0229* (2013.01); *Y10T 29/49171* (2015.01)

(58) Field of Classification Search
CPC .... H04M 1/0229; H04M 1/0218; H02G 1/00; G06F 1/1683; G06F 1/1616; G06F 1/1681
USPC .......... 174/375, 68.3, 66, 651, 656, 260, 376; 439/271, 638, 341–343, 31, 165, 467, 439/596; 361/679.3, 679.27, 679.28; 248/81; 16/221
See application file for complete search history.

(56) References Cited

U.S. PATENT DOCUMENTS

| 4,684,190 | A | * | 8/1987 | Clark et al. ................... 439/587 |
| 5,083,933 | A | * | 1/1992 | Colleran et al. .............. 439/357 |
| 5,355,279 | A | * | 10/1994 | Lee et al. ................. 361/679.09 |
| 5,395,264 | A | * | 3/1995 | Keith ............................ 439/502 |
| 5,681,176 | A | * | 10/1997 | Ibaraki et al. ................. 439/165 |
| 5,897,382 | A | * | 4/1999 | Takahashi ....................... 439/31 |
| 5,995,373 | A | * | 11/1999 | Nagai ........................... 361/755 |

(Continued)

FOREIGN PATENT DOCUMENTS

KR    10-2006-0120905 A    11/2006

OTHER PUBLICATIONS

Senatori, Mark David, Corrected Version of the International Search Report and Written Opinion, Date of Mailing: Sep. 9, 2010, International Application No. PCT/US2009/068611 filed Dec. 18, 2009, 8 pages.

*Primary Examiner* — Jinhee Lee
*Assistant Examiner* — Abhishek Rathod
(74) *Attorney, Agent, or Firm* — HPI Patent Department

(57) ABSTRACT

A connector apparatus, system, and method are provided. The connector can include a first end (105A) and a second end (105B) operably connected by a flexible member (150). The first end and the second end can each comprise a backing member (110), comprising a plurality of fasteners (125) and an aperture (115) operably connected to the flexible member. The backing member can be at least partially encapsulated using a material (130) forming a surface (135). A compressible sealing member (145) can be disposed at least partially about the surface.

7 Claims, 2 Drawing Sheets

(56) References Cited

U.S. PATENT DOCUMENTS

| | | | |
|---|---|---|---|
| 6,074,254 A * | 6/2000 | Schultz et al. | 439/638 |
| 6,163,452 A * | 12/2000 | O'Neal et al. | 361/679.27 |
| 6,213,782 B1 * | 4/2001 | Derstine | 439/31 |
| 6,266,238 B1 * | 7/2001 | Paulsel et al. | 361/679.27 |
| 6,288,896 B1 | 9/2001 | Hsu | |
| 6,447,314 B1 * | 9/2002 | Kato et al. | 439/165 |
| 6,743,052 B1 * | 6/2004 | Lin et al. | 439/620.15 |
| 6,900,981 B2 * | 5/2005 | Kuivas et al. | 361/679.06 |
| 7,466,558 B2 * | 12/2008 | Yasuda | 361/755 |
| 7,637,784 B2 * | 12/2009 | Evans | 439/638 |
| 2004/0127091 A1 * | 7/2004 | Naito et al. | 439/488 |
| 2004/0157481 A1 * | 8/2004 | Watanabe | 439/165 |
| 2005/0070154 A1 * | 3/2005 | Milan | 439/502 |
| 2006/0053591 A1 * | 3/2006 | Ibaraki et al. | 16/367 |
| 2007/0000088 A1 | 1/2007 | Mao et al. | |
| 2007/0082509 A1 * | 4/2007 | Kuo | 439/45 |
| 2007/0159782 A1 * | 7/2007 | Nakajima | 361/683 |
| 2007/0243767 A1 * | 10/2007 | Chen et al. | 439/639 |
| 2008/0139005 A1 * | 6/2008 | Guo et al. | 439/39 |
| 2008/0151478 A1 | 6/2008 | Chern | |
| 2008/0174943 A1 * | 7/2008 | Hirasawa et al. | 361/681 |
| 2009/0101405 A1 * | 4/2009 | Kawai et al. | 174/70 R |
| 2009/0221161 A1 * | 9/2009 | Zhu | 439/78 |
| 2010/0261363 A1 * | 10/2010 | Sakakura | 439/271 |
| 2011/0053398 A1 * | 3/2011 | Arai et al. | 439/271 |

* cited by examiner

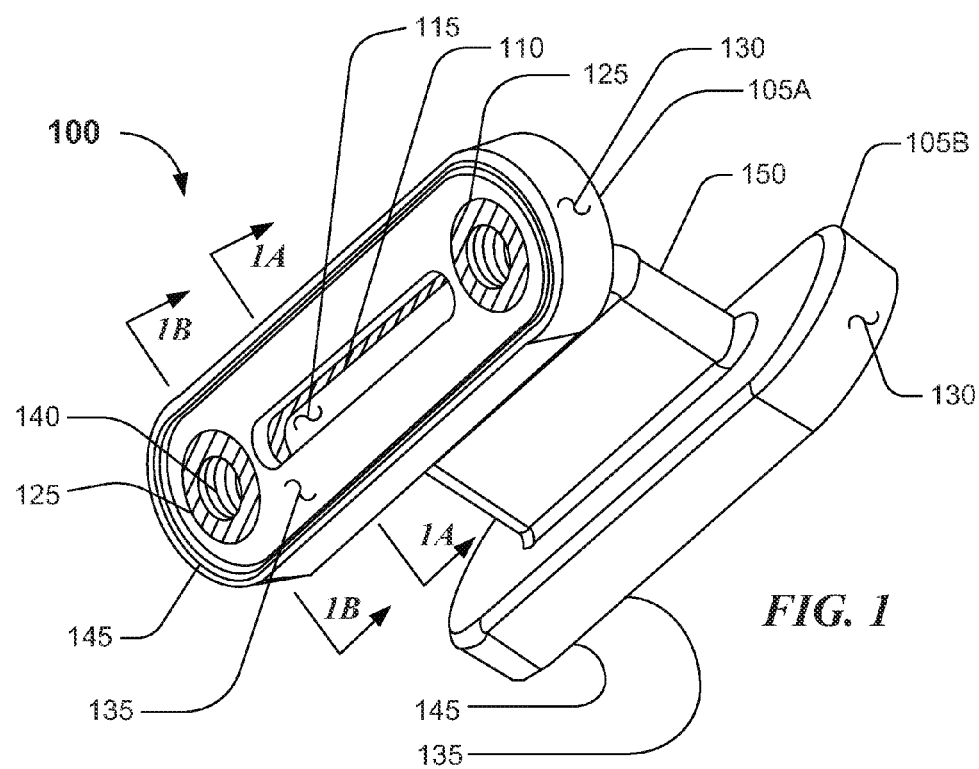
FIG. 1
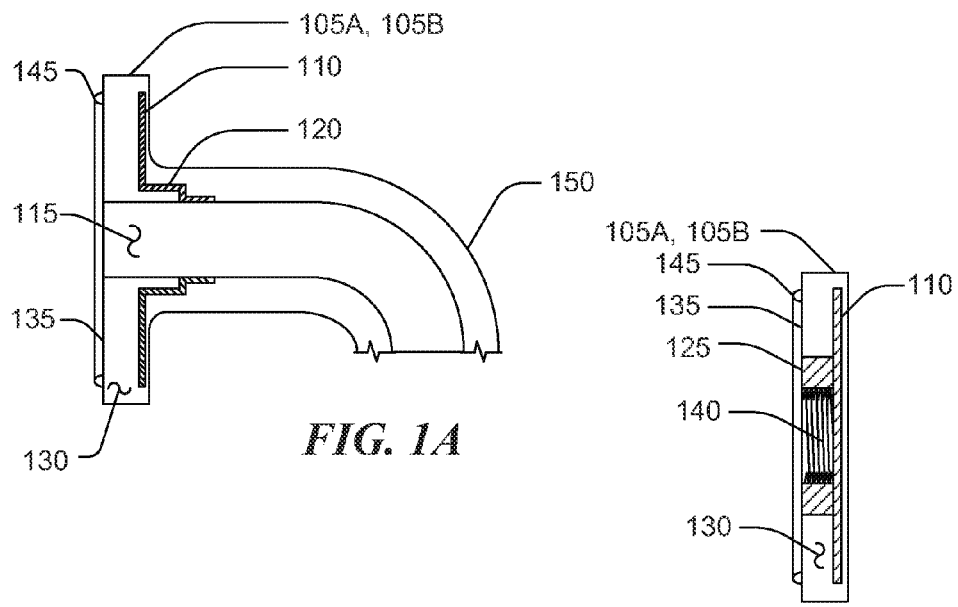
FIG. 1A
FIG. 1B

CONNECTION SYSTEMS AND METHODS

BACKGROUND OF THE INVENTION

Electronic devices come in many shapes, forms, and sizes. The use of "clamshell" type devices, an electronic device having two or more housings connected using one or more hinges (i.e. structurally resembling a bi-valve clam), provide many attendant advantages. However, electrical conduits linking the housings forming the electronic device provide passages that permit the ingress of dust, water, and other contaminants that can adversely affect the performance or operation of the electronic device.

BRIEF DESCRIPTION OF THE DRAWINGS

Advantages of one or more disclosed embodiments may become apparent upon reading the following detailed description and upon reference to the drawings in which:

FIG. 1 is a lower perspective view depicting an illustrative connector, according to one or more embodiments described herein;

FIG. 1A is a partial sectional view depicting the illustrative connector depicted in FIG. 1, along line 1A-1A, according to one or more embodiments described herein;

FIG. 1B is a partial sectional view depicting the illustrative connector depicted in FIG. 1, along line 1B-1B, according to one or more embodiments described herein.

DETAILED DESCRIPTION

Figure 2:
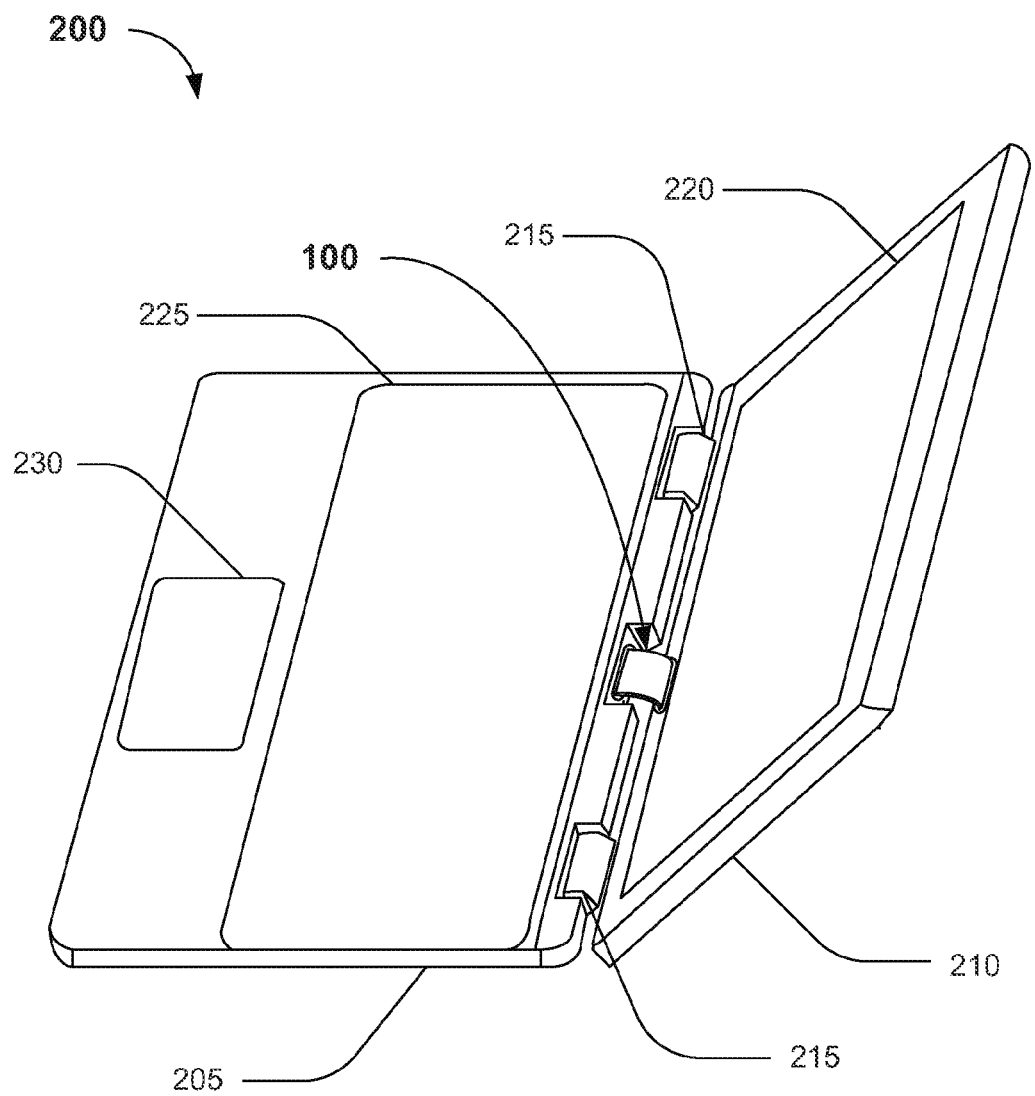
FIG. 2 is an upper perspective view of an illustrative system incorporating an illustrative connector, according to one or more embodiments described herein.

Electronic devices comprising two or more enclosures, housings, or bodies are abundant in everyday life. Typical examples range from conventional clamshell computers (e.g. laptop computers, netbook computers), to handheld gaming devices (e.g. Nintendo™ Gameboy® SP), to cellular communications devices. All of these devices share a common element, a hinge connection between the various housings forming the device. Mechanical hinges provide strong, durable, resilient connections between the various housings. Often electrical connections are required between the various housings forming the electronic device, for example between a housing containing one or more input devices (e.g. an alphanumeric keypad) and a housing containing one or more display devices (e.g. an organic light emitting diode ("OLED") display). These electrical connections can provide one or more unintentional passageways permitting the entry of dust, water, and other contaminants into the housing.

A connector apparatus is provided. The connector can include a first end and a second end operably connected by a flexible member. The first end and the second end can each comprise a backing member, comprising a plurality of fastening devices and an aperture operably connected to the flexible member. The backing member can be at least partially encapsulated using an material forming a surface. A compressible sealing member can be disposed at least partially about the surface. The compressible sealing member can provide a waterproof and dust-tight seal where the connector is disposed proximate a housing disposed at least partially about an electronic device.

A connector system is also provided. The system can include a first electronic device operably connected to a second electronic device using a connector. The connector can include a first end and a second end operably connected by a flexible member; wherein the first end and the second end each comprise a backing member, comprising a plurality of fastening devices and an aperture operably connected to the flexible member. The backing member can be at least partially encapsulated using a material forming a surface. A compressible sealing member can be disposed at least partially about the surface wherein the first end compressible sealing member can form a waterproof and dust-tight seal with the first electronic device; and wherein the second end compressible sealing member can form a waterproof and dust-tight seal with the second electronic device.

A method of connecting two electronic devices is also provided. The method can include attaching a first end of a connector to a first electronic device. The method can further include compressing a sealing member disposed about and integral with the first end of the connector against at least a portion of the first electronic device to form a waterproof and dust tight seal therebetween. The method can also include attaching a second end of the connector to a second electronic device. The method can also include compressing a sealing member disposed about and integral with the second end of the connector against at least a portion of the second electronic device to form a waterproof and dust tight seal therebetween.

FIG. 1 is a lower perspective view depicting an illustrative connector 100, according to one or more embodiments. FIG. 1A is a partial sectional view depicting the illustrative connector 100 depicted in FIG. 1, along line 1A-1A, according to one or more embodiments. FIG. 1B is a partial sectional view depicting the illustrative connector 100 depicted in FIG. 1, along line 1B-1B, according to one or more embodiments. The connector 100 can include a first end 105A and a second end 105B operably connected by a flexible member 145.

As used herein, an "operable connection", or a connection by which two or more entities are "operably connected" is one in which the two or more entities are physically connected, logically connected, or both physically and logically connected. Such physical connections can be direct, for example where the two entities are directly attached to each other; or indirect, for example where the two entities are attached using one or more intermediate members. Such interactions can also include logical interactions where one or more signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

The first end 105A, the second end 105B, or both the first 105A and second 105B ends can include a backing member 110. The backing member 110 can include a plurality of fastening devices 125 and an aperture 115. In at least some embodiments, the backing member 110 can be a rigid member. In some embodiments, the backing member 110 can be a single piece, rigid member. In some embodiments, the backing member 110 can be a multi-piece member where the multiple pieces forming the member are rigidly or semi-rigidly attached to each other. In some embodiments, the flexible member 150 can attach to or be otherwise disposed proximate at least a portion of the backing member aperture 115. In some embodiments, the backing member can be at least partially encapsulated using a material 130. In some embodiments, the material 130 can form a surface 135. A compressible sealing member 145 can be disposed at least partially about all or a portion of the surface 135.

The backing member 110 can include any number of systems, devices, or combination of systems and devices suitable for providing a physically rigid structure. The backing member 110 can, at least in some embodiments, provide a rigid "backbone" or underlying structure for at least a portion of the first end 105A, the second end 105B, or both the first end 105A and the second end 105B of the connector 100. The backing member 110 can be a metallic, non-metallic, or composite member. In some embodiments, the backing member 110 can be a metallic member including, for example aluminum, steel, stainless steel, or the like. In some embodiments, the backing member 110 can be a non-metallic member including, for example a polymer, carbon fiber, or the like. In some embodiments, the backing member 110 can be a composite member, for example a polymer or carbon fiber coated metallic member.

At least one aperture 115 can be disposed about the backing member 110, completely penetrating the backing member 110. In some embodiments, an aperture 115 can centrally penetrate a single or multi-piece rectangular, oval or rounded planar backing member 110. In some embodiments a flange 120 can extend from the backing member 110. In some embodiments, the flange 120 can extend at least partially into the flexible member 150. In some embodiments, for example as depicted in the connector sectional view in FIG. 1A, the flange 120 can extend partially or completely about the aperture 115. In some embodiments, the flange 120 can reinforce or otherwise strengthen the joint that operably connects the first and second ends 105A, 105B to the flexible member 150.

A plurality of fasteners 125 can be disposed in, on, or about the backing member 110. All or a portion of the plurality of fasteners 125 can include any type of detachable fastener, for example latching or threaded fasteners, or any type of non-detachable fastener, for example rivets. In at least some embodiments, all or a portion of the plurality of fasteners 125 can include a threaded fastener, for example a plurality of female threaded fasteners 125 attached to at least one surface of a planar backing member 110, as illustratively depicted in FIGS. 1 and 1B. The use of a female threaded fastener 125 can permit the threaded connection of the first and second ends 105A, 105B to a mating device using at least one male threaded fastener, for example a machine screw.

At least a portion of the backing member 110 can be partially or completely encapsulated or covered with a material 130. The material 130 can include any non-electrically conductive material, for example one or more rigid, semi-rigid, or flexible polymers, one or more natural or synthetic rubbers, or the like. In at least some embodiments, at least a portion of the material 130 at least partially encapsulating the backing member 110 can form a surface 135. The backing member 110, the surface 135, or both the backing member 110 and the surface 135 can have any physical geometry, for example planar (as depicted in FIGS. 1, 1A, 1B), convex, concave, curved, or the like. In at least some embodiments, all or a portion of the surface 135 can be flush with at least a portion of the one or more fasteners 125. In at least some embodiments, the aperture 115 can extend partially or completely through the material 130 thereby permitting access to all or a portion of the aperture 115 from the surface 135 of the first end 105A, second end 105B, or first and second ends 105A, 105B, as depicted in FIGS. 1, 1A, and 1B.

A compressible sealing member 145 can be disposed in, on, or about all or a portion of the surface 135. The compressible sealing member 145 can include any number of devices, systems, or combination of systems and devices suitable for providing a compression seal between the first and second ends 105A, 105B and any device attached respectively thereto. In some embodiments, the compressible sealing member 145 can provide a waterproof and dust-tight seal between the connector and electrical devices attached to the first and second ends 105A, 105B. The compressible sealing member 145 can include any elastomeric material having a durometer rating (ASTM D2240) less than or equal to the material 130 forming the surface 135.

In at least some embodiments, the compressible sealing member 145 can include any elastomeric material having a relatively low durometer material when compared to the relatively high durometer material 130 forming the surface 135. For example, in some embodiments, the compressible sealing member 145 can include a material having a Shore Durometer A-scale rating of approximately 55 (ASTM D2240), while the material 130 forming the surface 135 can be a material having a Shore Durometer A-scale rating of approximately 98 (ASTM D2240).

Other materials having a differing hardness can be substituted with equal efficiency for the compressible sealing member 145, however the Shore Durometer rating of the compressible sealing member 145 can be relatively lower than the Shore Durometer rating of the material 130 forming the surface 135 to provide a waterproof and dust-tight seal between the connector and any electronic device attached thereto. In some embodiments, the compressible sealing member 145 can have a Shore Durometer A-scale rating (ASTM D2240) of from about 0 to about 40; from about 0 to about 60; from about 0 to about 80; or from about 0 to about 90. In some embodiments, the compressible sealing member 145 can have a Shore Durometer D-scale rating (ASTM D2240) of from about 0 to about 10; from about 0 to about 20; from about 0 to about 30; or from about 0 to about 40.

In some embodiments, for example the embodiment depicted in FIGS. 1, 1A, and 1B, the compressible sealing member 145 can be a circular or semi-circular member disposed continuously about the perimeter of the first end 105A, the second end 105B, or both the first end 105A and the second end 105B. In some embodiments, the compressible sealing member 145 can be a continuous or semi-continuous layer of compressible material disposed across all or a portion of the surface 135 formed by the material 130. In some embodiments, the compressible sealing member 145 can have a circular or semicircular profile, and can be disposed in a semicircular groove formed at least partially within the surface 135. In other embodiments, the compressible sealing member 145 can be integrally formed with the surface 135.

The flexible member 150 can be any structure operably connecting the first and second ends 105A, 105B. In some embodiments, the flexible member 150 can include a hollow, tubular member as depicted in FIGS. 1, 1A and 1B. In some embodiments, the flexible member 150 can be integral with the first end 105A, the second end 105B, or both the first and second ends 105A, 105B. The flexible member 150 can have one or more surface features, for example slots, undercuts, and the like, to increase the flexibility of the flexible member 150. In some embodiments, the flexible member 150 can be a pliable or deformable member that can be squeezed or otherwise manipulated to facilitate the passage of objects, such as electrical connectors, therethrough.

The flexible member 150 can be a hollow member having an inner surface and an outer surface. In some embodiments, the inner surface of the flexible member 150 can be substantially similar in geometric properties to the aperture 115, thereby providing a continuous path from the first end 105A surface 135 to the second end 105B surface 135. The continuous path formed by the flexible member 150 can be waterproof and dust-tight at the first end 105A and the second end 105B, thereby facilitating the passage of electrical conductors or cooling fluids such as water and aft through the flexible member 135 with comparable ease and efficiency.

FIG. 2 is an upper perspective view of an illustrative system 200 incorporating the illustrative connector 100, according to one or more embodiments. In one or more embodiments, the system 200 can include a first electronic device 205 and a second electronic device 210, pivotably connected by at least one hinge 215 forming one or more axes of rotation. The connector 100 can be attached at the first end 105A to the first electronic device 205 and attached at the second end 105B to the second electronic device 210, to provide a waterproof and dust-tight passage linking the two electronic devices 205, 210.

The first and second electronic devices 205, 210 can include any number of systems, devices, or combination of systems and devices suitable for housing or otherwise partially or completely enclosing one or more electronic devices. In some embodiments, the first and second electronic devices 205, 210 can form a clamshell computing device, for example: a notebook computer, a laptop computer, an ultraportable computer, a netbook computer, a tablet notebook computer, a handheld gaming device, or a handheld cellular communication device. In some embodiments, the connector 100 can facilitate the passage of at least one electrical signal or circuit between the first electronic device 205 and the second electronic device 210. In some embodiments, the connector 100 can facilitate the passage of a cooling fluid, for example water or air, between the first electronic device 205 and the second electronic device 210.

In some embodiments, the first electronic device 205 can include a laptop computer base enclosure as depicted in FIG. 2. The laptop computer base enclosure can include one or more input devices, for example a keyboard 225, and a touchpad 230, for providing user input to a central processing unit ("CPU"). In some embodiments, the second electronic device 210 can include a laptop computer display enclosure as depicted in FIG. 2. The laptop computer display enclosure can include one or more output devices 220, for example a liquid crystal ("LCD") display, a light emitting diode ("LED") display, or an organic LED ("OLED") display.

In some embodiments, the first end 105A of the connector 100 can form a waterproof and dust-tight seal with the first electronic device 205. Similarly, the second end 105B of the connector 100 can form a waterproof and dust-tight seal with the second electronic device 210. The aperture 115 through the connector 100 can connect or otherwise link the first electronic device 205 with the second electronic device 210 via the flexible member 150. In some embodiments, the connector 100 can facilitate the passage of at least one electrical conductor, signal, or circuit between the first electronic device 205 and the second electronic device 210.

In one or more embodiments, the first end 105A of connector 100 can be disposed proximate the first electronic device 205. At least one male-threaded fastener can be used to attach the first end 105A of the connector 100 to the first electronic device 205. At least a portion of the male-threaded fastener can engage at least a portion of the female threads 140 disposed within the fastener 125 on the first end 105A of connector 100. As the male-threaded fastener is tightened into the mating fastener 125 on the first end 105A of the connector 100, the compressible sealing member 145 can be compressed against the first electronic device 205 housing, forming a waterproof and dust-tight seal therebetween.

In a similar manner, the second end 105B of connector 100 can be disposed proximate the second electronic device 205. At least one male-threaded fastener can be used to attach the second end 105B of the connector 100 to the second electronic device 210. At least a portion of the male-threaded fastener can engage at least a portion of the female threads 140 disposed within the fastener 125 on the second end 105B of connector 100. As the male-threaded fastener is tightened into the mating fastener 125 on the second end 105A of the connector 100, the compressible sealing member 145 can be compressed against the second electronic device 210 housing, forming a waterproof and dust-tight seal therebetween. In at least some embodiments, the flexible member 150 of the connector 100 can be coaxially aligned with the axis of rotation of the one or more hinges 215 as depicted in FIG. 2.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

While the foregoing is directed to embodiments of the present invention, other and further embodiments of the invention may be devised without departing from the basic scope thereof, and the scope thereof is determined by the claims that follow.

What is claimed is:
1. A computing system, comprising:
a base portion including a user input device;
a display portion;
a hinge pivotably connecting the base portion to the display portion; and
a flexible connection mechanism that attaches to both the base portion and the display portion;
wherein the flexible connection mechanism comprises:
   a first end including a first compressible sealing member, a first fastener to be attached to the base portion, and a first aperture, the first aperture to provide a passageway for a plurality of conductors electrically connecting the base portion and the display portion, wherein the first fastener being attached to the base portion causes the first compressible sealing member to be compressed thereby engaging the first sealing member to form a first seal;
   a second end including a second compressible sealing member, a second fastener to be attached to the display portion, and a second aperture, the second aperture to provide a passageway for the plurality of conductors, wherein the second fastener being attached to the display portion causes the second compressible sealing member to be compressed thereby engaging the second sealing member to form a second seal; and
   a flexible hollow conduit to extend between the first and second ends to circumscribe the plurality of conductors and provide a continuous interior space between the first and second apertures to route the plurality of conductors between the first and second ends.

2. The computing system of claim 1 wherein when each of the first and second fasteners are attached to the corresponding base portion and display portion, the respective compressible sealing member is compressed against the corresponding base portion or display portion to form the respective first and second seals.

3. The computing system of claim 2 wherein each of the first and second ends includes a flange that extends from a backing member and at least partially surrounds the respective aperture.

4. The computing system of claim 1 wherein each of the first and second ends includes a flange that at least partially surrounds the respective aperture.

5. The computing system of claim 1 wherein the first and second fasteners are threaded.

6. The computing system of claim 1 wherein each of the first and second ends includes a pair of fasteners on opposing ends of the respective first and second apertures.

7. The computing system of claim 1 wherein the computing system is a laptop computer.

\* \* \* \* \*